US010361606B2

(12) United States Patent
Sautier et al.

(10) Patent No.: US 10,361,606 B2
(45) Date of Patent: Jul. 23, 2019

(54) HYDRAULIC ANTI-VIBRATION DEVICE PROVIDED WITH AN ELECTRICITY GENERATOR DEVICE AND ELECTRICITY GENERATOR DEVICE FOR SUCH AN ANTI-VIBRATION DEVICE

(71) Applicant: HUTCHINSON, Paris (FR)

(72) Inventors: Pascal Sautier, Paucourt (FR); Gérard Tavin, Angers (FR); Alain Bellamy, Ambloy (FR); Gabriel Lemaire, Saint-Denis-les-Ponts (FR)

(73) Assignee: HUTCHINSON, Paris (FR)

( * ) Notice: Subject to any disclaimer, the term of this patent is extended or adjusted under 35 U.S.C. 154(b) by 0 days.

(21) Appl. No.: 15/122,209

(22) PCT Filed: Mar. 12, 2014

(86) PCT No.: PCT/FR2014/050553
§ 371 (c)(1),
(2) Date: Aug. 29, 2016

(87) PCT Pub. No.: WO2015/136160
PCT Pub. Date: Sep. 17, 2015

(65) Prior Publication Data
US 2016/0365774 A1    Dec. 15, 2016

(51) Int. Cl.
*F03B 1/04* (2006.01)
*H02K 7/18* (2006.01)
(Continued)

(52) U.S. Cl.
CPC ............ *H02K 7/1823* (2013.01); *F03B 1/04* (2013.01); *F16F 13/105* (2013.01); *F16F 13/264* (2013.01)

(58) Field of Classification Search
CPC .... F03B 1/00; F03B 11/04; F03B 1/04; F03B 3/18; F03B 15/20; F03B 13/262;
(Continued)

(56) References Cited

U.S. PATENT DOCUMENTS 3,533,222 A * 10/1970 Gasperini .............. B01D 45/14
                                                    209/135
4,768,759 A *  9/1988 Bellamy ................ F16F 13/262
                                                    248/566
(Continued)

FOREIGN PATENT DOCUMENTS

CN    102288281 A    12/2011
GB      2175962 A    12/1986
(Continued)

OTHER PUBLICATIONS

International Search Report Application No. PCT/FR2014/050553 dated Jan. 23, 2015.
(Continued)

*Primary Examiner* — Charles Reid, Jr.
(74) *Attorney, Agent, or Firm* — Miller, Matthias & Hull LLP

(57) ABSTRACT

Antivibration device comprising two frames and an elastomer body interconnecting said frames and delimiting a first hydraulic chamber linked to a second deformable hydraulic chamber via a throttle passage. A microturbine is rotatably mounted in the throttle passage and is coupled to a generator. The microturbine is configured to be always driven in the same rotational direction by the fluid when the fluid reciprocates along opposing first and second paths within the throttle passage.

12 Claims, 4 Drawing Sheets

Figure 1:
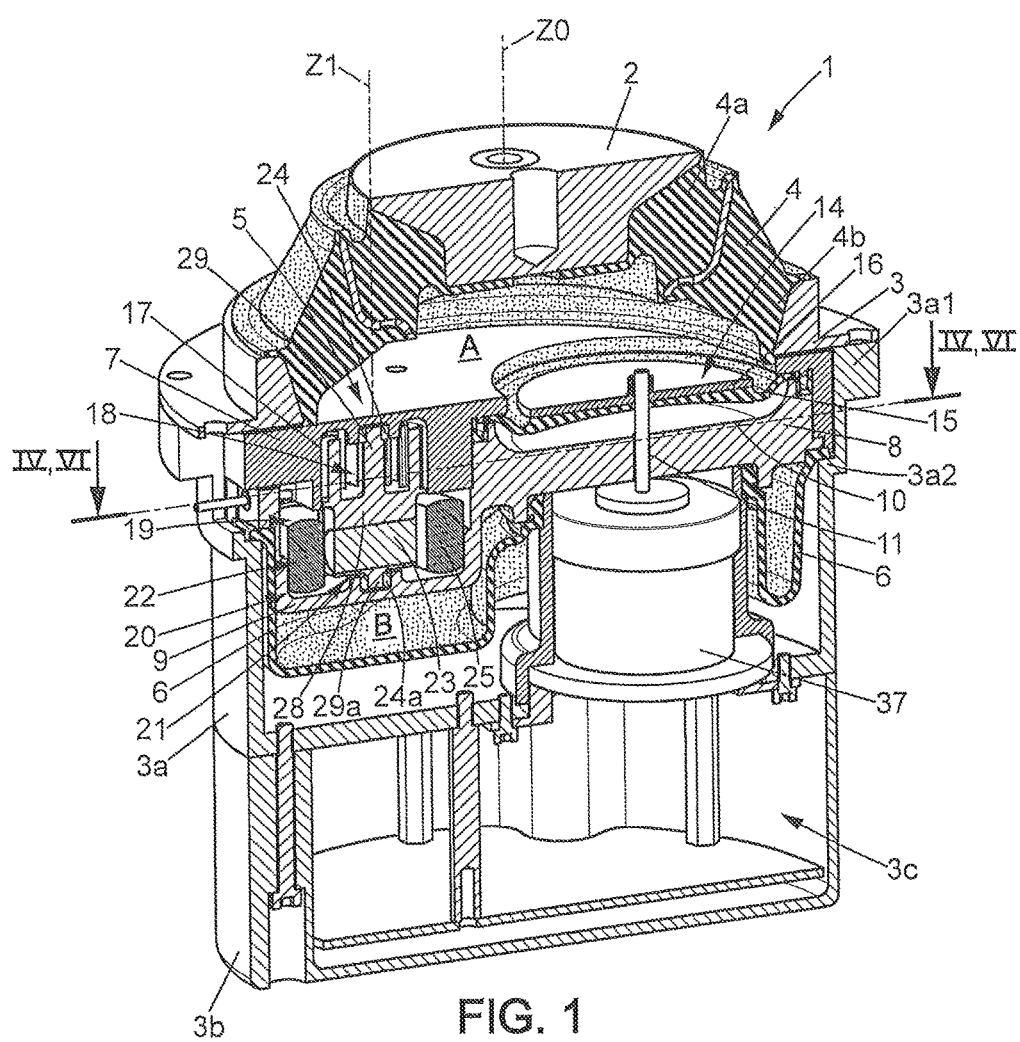

(51) Int. Cl.
*F16F 13/10* (2006.01)
*F16F 13/26* (2006.01)

(58) Field of Classification Search
CPC ... H02K 7/1823; H02K 7/1853; F16F 13/105; F16F 13/264; Y02E 10/28; Y02E 10/38; B63B 35/44; B63B 21/50; B63B 2035/4466; F05D 2240/93
USPC .............................. 415/202; 290/52, 54, 43
See application file for complete search history.

(56) References Cited

U.S. PATENT DOCUMENTS

| | | | | | |
|---|---|---|---|---|---|
| 4,869,478 | A | * | 9/1989 | Bouhours | F16F 13/262 180/312 |
| 5,333,994 | A | * | 8/1994 | Doty | G01R 33/307 415/200 |
| 5,406,797 | A | * | 4/1995 | Kawamura | F02B 37/005 290/52 |
| 6,032,459 | A | * | 3/2000 | Skowronski | F01D 15/10 60/262 |
| 6,093,975 | A | * | 7/2000 | Peticolas | F02C 9/56 290/40 A |
| 6,198,174 | B1 | * | 3/2001 | Nims | F01D 15/10 290/52 |
| 6,364,294 | B1 | * | 4/2002 | Gennesseaux | F16F 13/264 267/140.13 |
| 6,392,313 | B1 | * | 5/2002 | Epstein | F01D 5/28 257/414 |
| 6,523,816 | B1 | * | 2/2003 | Gastineau | F16F 13/264 267/140.14 |
| 7,279,803 | B1 | * | 10/2007 | Bosley | F03B 3/126 290/43 |
| 7,541,687 | B2 | * | 6/2009 | Stahlhut | H02P 9/00 290/52 |
| 8,026,621 | B2 | * | 9/2011 | Miller | F03D 3/0409 290/43 |
| 8,629,572 | B1 | * | 1/2014 | Phillips | F03B 13/16 290/53 |
| 2002/0125400 | A1 | * | 9/2002 | Takashima | F16F 13/101 248/618 |
| 2006/0157902 | A1 | * | 7/2006 | Sakata | B60K 5/1208 267/140.13 |
| 2006/0261529 | A1 | * | 11/2006 | Yamamoto | F16F 13/101 267/140.11 |
| 2006/0266153 | A1 | * | 11/2006 | Clary | B06B 1/166 74/570.21 |
| 2008/0224476 | A1 | * | 9/2008 | Kim | F01B 11/001 290/1 A |
| 2010/0026002 | A1 | * | 2/2010 | Spooner | F03B 13/083 290/54 |
| 2010/0109218 | A1 | * | 5/2010 | Lemaire | F16F 13/106 267/140.13 |
| 2010/0207388 | A1 | * | 8/2010 | Nyffenegger | F03B 13/00 290/43 |
| 2010/0219641 | A1 | | 9/2010 | Namuduri | |
| 2011/0025066 | A1 | * | 2/2011 | Cipriani | H02K 7/1823 290/52 |
| 2012/0299228 | A1 | * | 11/2012 | Matsuda | F16F 13/102 267/140.11 |
| 2013/0177394 | A1 | * | 7/2013 | Yamada | F03C 1/0623 415/10 |

FOREIGN PATENT DOCUMENTS

| | | | | |
|---|---|---|---|---|
| GB | 2461983 | A | * 1/2010 | ........... F03B 13/184 |
| JP | S61173780 | U | 10/1986 | |
| JP | S61286632 | A | 12/1986 | |
| JP | H03123981 | U | 12/1991 | |
| JP | 2002235793 | A | 8/2002 | |
| JP | 2006022960 | A | 1/2006 | |
| JP | 2008095930 | A | 4/2008 | |
| JP | 2009115301 | A | 5/2009 | |
| JP | 2011510606 | A | 3/2011 | |
| JP | 2011099474 | A | 5/2011 | |
| JP | 2015017643 | A | 1/2015 | |
| WO | WO 2010/115805 | A1 | 10/2010 | |

OTHER PUBLICATIONS

Mohareri O et al: "Energy harvesting from vibration of a hydraulic engine mount using a turbine", Mechatronics (ICM), 2011 IEEE International Conference on, IEEE, Apr. 13, 2011 (Apr. 13, 2011), pp. 134-139, XP031911290, DOI: 10.1109/ICMECH.2011.5971270 ISBN: 978-1-61284-982-9 le document en entier.

Mohareri O et al: "Vibration energy harvesting of a hydraulic engine mount using a turbine": Proceedings of the ASME 2010 International Mechanical Engineering Congress & Exposition IMECE2010, Nov. 12-18, 2010, Vancouver, British Columbia, Canada, IMECE2010-40220.

* cited by examiner

HYDRAULIC ANTI-VIBRATION DEVICE PROVIDED WITH AN ELECTRICITY GENERATOR DEVICE AND ELECTRICITY GENERATOR DEVICE FOR SUCH AN ANTI-VIBRATION DEVICE

CROSS-REFERENCE TO RELATED APPLICATION

This Application is a 35 USC § 371 US National Stage filing of International Application No. PCT/FR2015/050553 filed on Mar. 12, 2014.

FIELD OF THE DISCLOSURE

The present invention relates to hydraulic antivibration mounts equipped with electricity-generating devices and to electricity-generating devices for such antivibration devices, More specifically, the invention relates to a hydraulic antivibration mount designed to be, introduced for damping purposes between the first and second rigid elements, whereby the antivibration mount comprises:

BACKGROUND OF THE DISCLOSURE

First and second frames adapted to be fixed to the two rigid elements to be united, An elastomer body connecting the first and second frames and at least partially bound to a first hydraulic chamber, A deformable second hydraulic chamber which connects to the first hydraulic chamber via a throttle passage, the first and second hydraulic chambers and the throttle passage forming a hydraulic circuit filled with fluid, and the antivibration mount being shaped so that said fluid reciprocates along opposing first and second paths within said throttle passage when the first and second frames are subject to relative vibration movements, An electric current-generating device comprising, firstly, a microturbine rotatably mounted about a rotation axis in the throttle passage and secondly, a generator coupled to the microturbine to produce electric current as the microturbine rotates.

Mohareri et al. have already proposed an antivibration mount of this type (Proceedings of the IEEE International Conference on Mechatronics, 13-15 Apr. 2011, Istanbul, Turkey, pp 134-139).

SUMMARY OF THE DISCLOSURE

The present invention is intended to improve the antivibration mounts of the above type, including increasing the amount of electricity produced.

To this end, according to the invention, an antivibration mount of the type in question is characterized in that the microturbine is configured to be always driven in the same rotational direction by the fluid when said fluid reciprocates along the first and second paths within the throttle passage.

As a result of these arrangements, the use of available hydropower is optimized for conversion into electric power, by avoiding energy wastage due to reversals in the rotational direction of the turbine.

In various embodiments of the antivibration mount according to the invention, one and/or the other of the following arrangements may furthermore be used:

The throttle passage includes a microturbine chamber wherein the microturbine is rotatably mounted, and first and second nozzles which open into said microturbine chamber from the first and second hydraulic chambers respectively at a substantial tangent relative to the rotation axis, said first and second nozzles opening respectively into the microturbine chamber along first and second injection paths, both corresponding to said rotational direction;

The first and second nozzles open into the microturbine chamber (17) at substantially diametrically opposite positions relative to the rotation axis;

The microturbine has curved blades arranged around the rotation axis in a median radial plane, each blade being substantially perpendicular to said median radial plane and including a substantially radial inner portion and an outer portion which is substantially arranged along the first and second injection paths when said blade is respectively aligned with the first and second nozzles;

The microturbine has blades arranged around the rotation axis in a median radial plane, each blade being substantially perpendicular to said median radial plane, and said microturbine having a clearance surrounded by the blades;

The blades occupy a first radial thickness and said clearance occupies a second radial thickness, said first radial thickness being between 0.47 and 0.87 times the sum of the first and second radial thicknesses;

The microturbine further comprises at least one hub extending along the rotation axis and at least one radial plate connecting said hub to the blades;

The microturbine chamber is a bore in a first fixed wall, said bore being delimited axially by a bottom and radially by a cylindrical surface into which the first and second nozzles open, said bore being closed by the plate opposite to the bottom of the bore, said hub being rotatably mounted in the bottom of the bore;

The generator comprises a stator and a rotor secured to the microturbine, said rotor including a pin which extends along the rotation axis opposite to said hub, said pin being rotatably mounted in the bottom of a housing containing the generator and being secured to said first fixed wall;

The throttle passage comprises first and second sections which open into the microturbine chamber through said first and second nozzles, said first and second sections and said first and second nozzles being delimited by first and second grooves carved into the first fixed wall and opening axially towards the second hydraulic chamber, said first and second grooves being axially closed by a second fixed wall secured to the first fixed wall and comprising said housing, the first and second fixed walls together forming a partition separating the first and second hydraulic chambers;

The generator comprises a rotor and a stator, the rotor having a 2.N number of alternating magnetic poles uniformly angularly distributed and belonging to at least one permanent magnet, where N is a positive integer, and the stator comprising a ferromagnetic ring arranged facing the magnetic poles and carrying a 2.N number of equally angularly distributed toroidal coils;

The antivibration mount further comprises an electronic circuit comprising at least an adapted converter for converting DC electrical power produced by the generator, an electric power storage device supplied by the converter, and a control device connected to a sensor and adapted to control an actuator based on information received from the sensor, said actuator being adapted to act on a portion of the antivibration mount;

Said sensor is a vibration sensor secured to the second frame;

Said actuator is adapted to selectively block or free a movable wall which partially delimits the first hydraulic chamber.

Furthermore, the invention also relates to a power-generating device usable in an antivibration mount as set out above, comprising:

A microturbine chamber connected to the first and second nozzles and wherein a microturbine is rotatably mounted about a rotation axis, A generator coupled to the microturbine to produce electricity as the microturbine rotates, characterized in that the microturbine is configured to be always driven in the same rotational direction when fluid reciprocates in opposing first and second paths between the first and second nozzles, the first and second nozzles opening into said microturbine chamber substantially tangentially to the rotation axis, said first and second nozzles opening into the microturbine chamber along first and second injection paths respectively, both corresponding to said rotational direction;

and in that the microturbine has blades arranged around the rotation axis in a median radial plane, each blade being substantially perpendicular to said median radial plane, and said microturbine having a clearance surrounded by the blades.

Other features and advantages of the invention shall appear in the following description of one of its embodiments, given by way of non-limitative example in the accompanying drawings.

Figure 2:
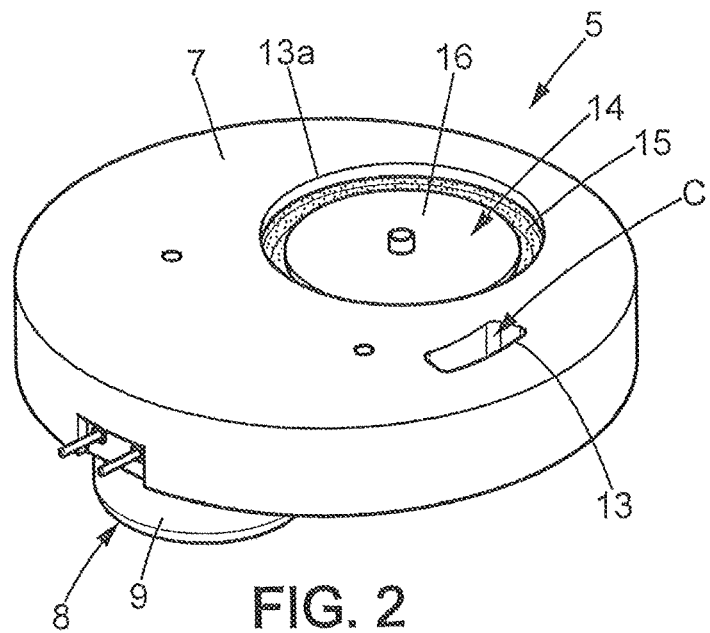
Figure 3:
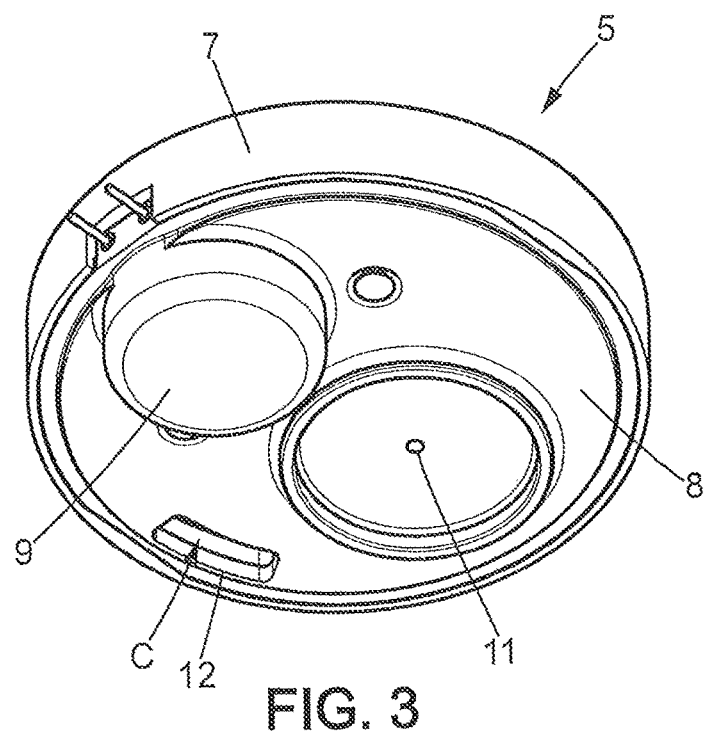
Figure 4:
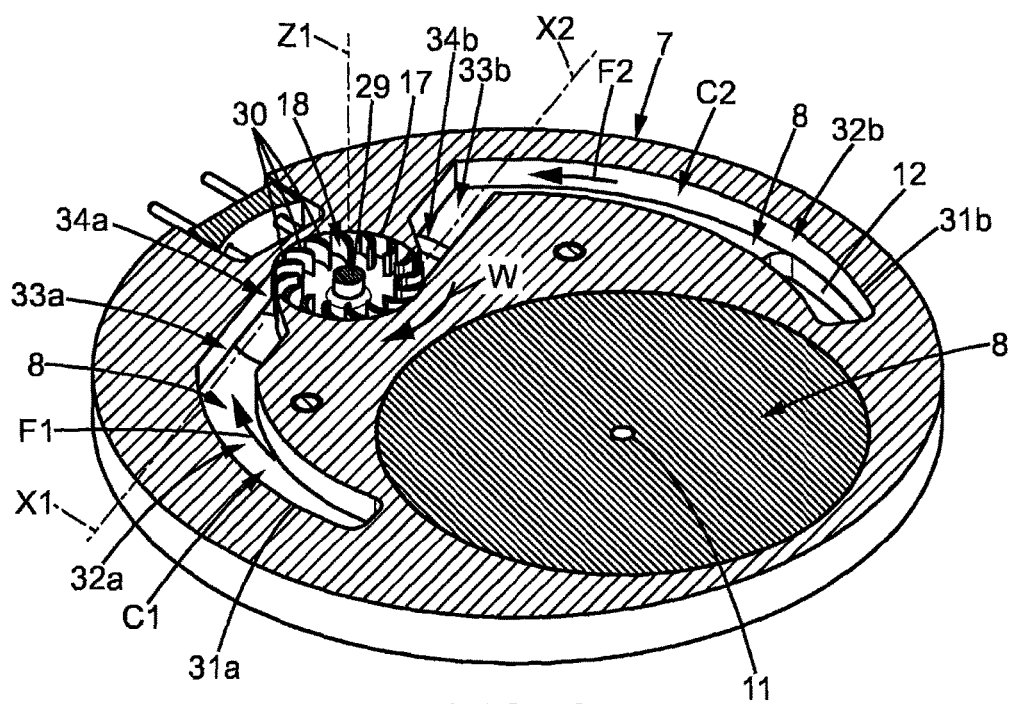
Figure 5:
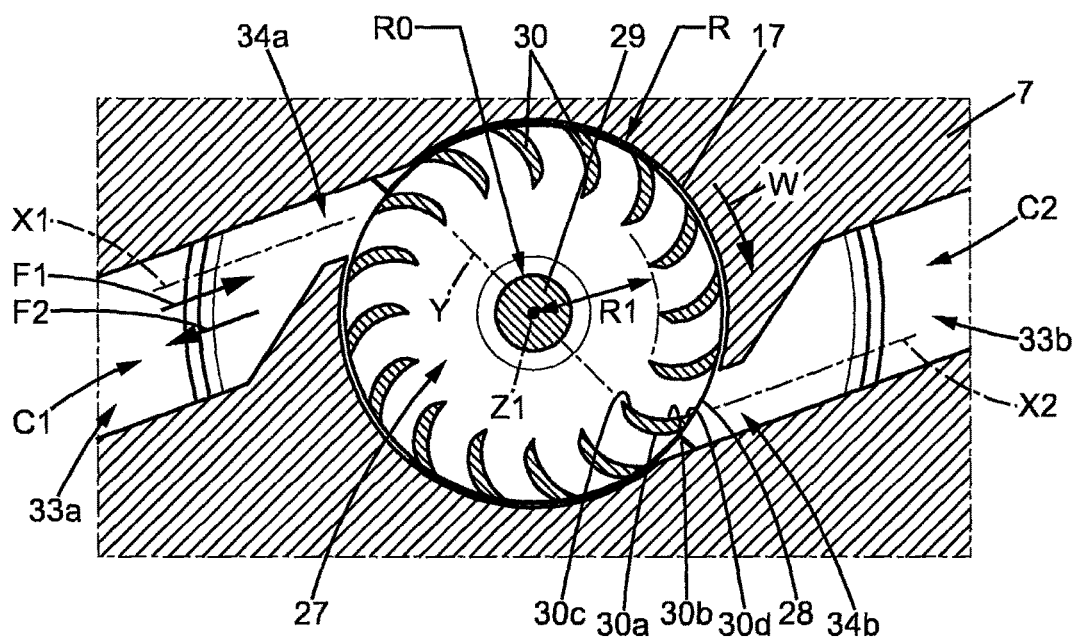
Figure 6:
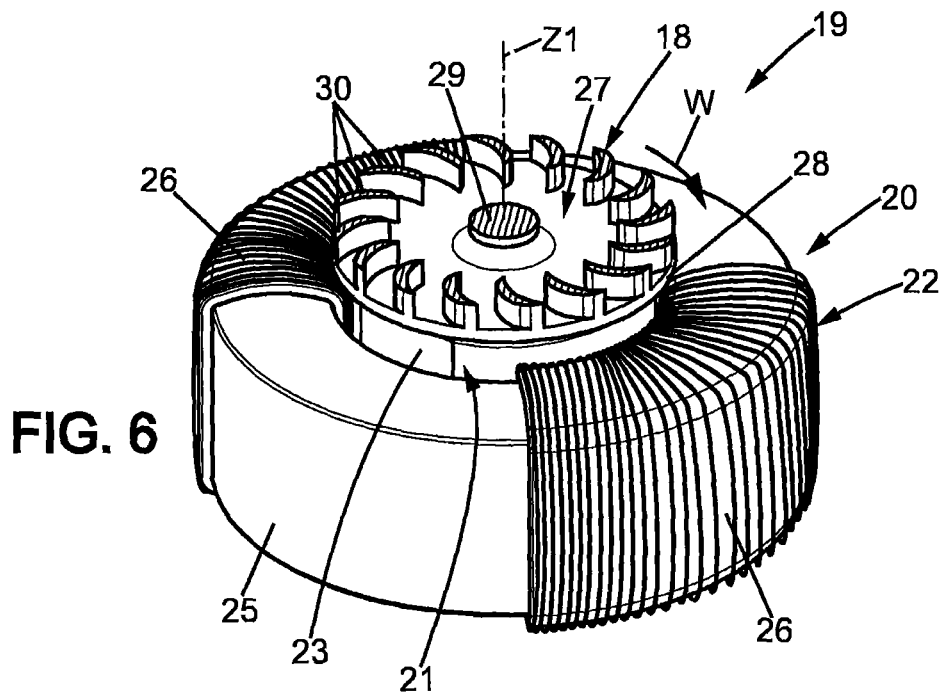
Figure 7:
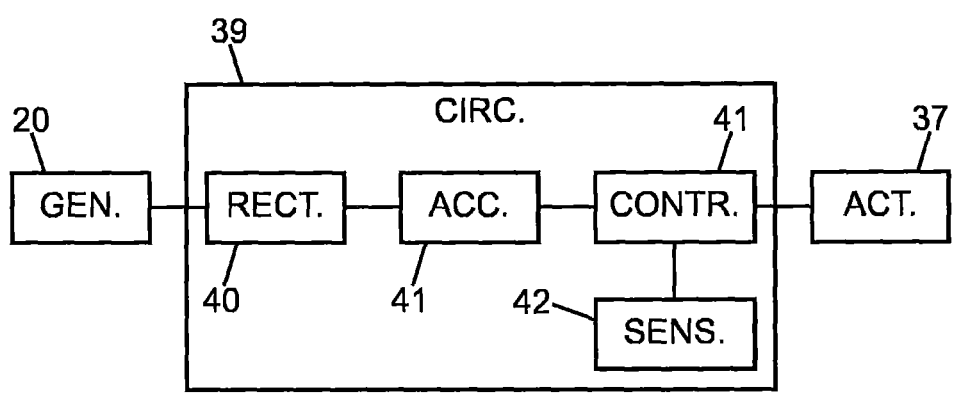

As regards the drawings:

FIG. 1 is a perspective view of an antivibration mount according to one embodiment of the invention, in axial section, FIGS. 2 and 3 are perspective views, ⅜views from above and below, the rigid partition separating the two hydraulic chambers of the antivibration mount in FIG. 1, FIG. 4 is a radial sectional view of the partition in FIGS. 2 and 3, the section being taken along the line IV-IV of FIG. 1, FIG. 5 is a detailed view of the section in FIG. 4, FIG. 6 is a radial sectional view of the electricity generator fitted to the antivibration mount in FIG. 1, the section being taken along the VI-VI line in FIG. 1, And FIG. 7 is a block diagram of the electronic circuit powering the antivibration mount in FIG. 1.

DETAILED DESCRIPTION OF THE DISCLOSURE

In the various figures, the same references refer to identical or similar items.

FIG. 1 shows a hydraulic antivibration mount 1, comprising:

A first rigid frame 2 having for example the form of a metal base and designed to be attached in particular to the vehicle engine to support it, A second rigid frame 3, for example an annular frame of metal or plastic material, intended to be fixed for example directly on the vehicle body, An elastomer body 4 especially able to withstand static forces due to the weight of the vehicle engine and connecting the first and second frames 2, 3, wherein said elastomer body may for example have a bell shape extending axially in a vertical Z0 axis, for example, between a top 4a bonded and moulded over the first frame 2 and an annular base 4b moulded and bonded onto the second frame 3.

The antivibration mount 1 further comprises a rigid radial partition 5, secured to the second frame 3 and applied sealingly against the base 4b of the elastomer body, delimiting therewith a first hydraulic chamber A, in this case a working chamber. A flexible elastomeric membrane forming bellows 6, applied tightly against radial partition 5 opposite to working chamber A, forming with said radial partition 5 a second hydraulic chamber. B, namely a compensation chamber, which links to working chamber A via a throttle passage C formed in rigid partition 5, visible in particular in FIGS. 2 to 4. The working chamber A and compensation chamber B and the passage C together form a hydraulic circuit filled with fluid, such as glycol or another.

The passage C is sized to have a resonance frequency between for example 5 and 20 Hz, typically between 8 and 12 Hz, on account of jolting movements due to the running of the vehicle.

In the example shown in FIG. 1, the hydraulic antivibration mount further comprises a lid 3a, made for example of moulded plastic material, which covers the bellows 6 downwards. This lid 3a may for example comprise a flange 3a1 fixed to the first frame by any means, for example by screwing, and the sidewall of said lid 3a may optionally have an internal shoulder 3a2 keeping the rigid partition 5 pressed against the second frame 3 and the base of the elastomer body.

The antivibration mount 1, may further comprise a easing 3b assembled for example under the cover 3a and delimiting an interior space 3c for housing an electronic circuit (not shown in Figure 1) described further below.

The rigid partition 5 may be formed by superimposed first and second fixed walls 7, 8, made for example of moulded plastic material or light alloy. The first fixed wall 7 may for example be arranged towards the working chamber A and the second fixed wall 8 towards the compensation chamber B.

As shown in FIGS. 1 to 4, the second fixed wall 8 may for example form a housing 9 opening upwards, i.e. towards the first fixed wall 8, and a bowl 10 also opening upwards. The second fixed wall 8 may further comprise an axial hole 11 in the centre of the bowl 10 and a downward opening 12, linking the throttle passage C with the compensation chamber B.

The first fixed wall 7 may comprise an opening 13 towards the top, linking passage C with the working chamber A, and optionally an orifice 13a closed by a movable wall 14 partially delimiting the working chamber A. The movable wall 14 may optionally include a rigid radial wall 16 sealingly connected to the first fixed wall 7 by an elastomer membrane 15. The bowl 10, together with the movable wall 14, thus delimits an air chamber filled with air.

As shown in FIGS. 1, 4, 5, 7, the first fixed wall may delimit a microturbine chamber 17 belonging to the throttle passage C and wherein a microturbine 18 is rotatably mounted about a Z1 rotation axis parallel to the Z0 axis. The microturbine 18 is part of an electric current-generating device 19 which further includes a generator 20 coupled to the microturbine 18 to produce electric current as the microturbine 18 rotates.

The generator 20 includes a stator 22 and a rotor 21 attached to the microturbine 18. The generator 20 may for example be contained in the housing 9 formed by the rigid second wall 8. The rotor 21 may be integrally formed with the microturbine 18.

According to an advantageous embodiment of the invention, the rotor 21 may comprise a 2N number of alternating magnetic poles uniformly angularly distributed around the Z1 rotation axis and belonging to at least one permanent magnet 23, N being a positive integer. In the example, N=1 and the rotor includes a single permanent magnet 23. The stator 22 comprises a ferromagnetic ring 25 arranged facing the magnetic poles and around them, and said ring 25 carrying a 2N number of toroidal coils uniformly angularly distributed, wherein two coils 26 wound in opposition, each with an angular span of 90 degrees, for example. This type of generator has the advantage of not having a hard point that may hinder the rotation of the rotor 21 and of the microturbine 18.

Of course, other types of electrical generator may be used. In particular, the stator may comprise permanent magnets (e.g. 12) and the rotor may comprise a ferromagnetic core forming radially salient poles (e.g. 4) around which coils are wound, so as to generate electric current during rotation of the rotor.

It is also possible to combine several microturbines with an electrical generator, for example by arranging them on either side of the rotor of the generator.

The microturbine chamber 17 may advantageously be a bore formed in a first fixed wall 7, said bore being upwardly axially delimited by a bottom and radially by a cylindrical surface.

The microturbine 18 may comprise a disc-shaped plate 28, radially arranged relative to the Z1 rotation axis and closing the above-mentioned bore downwards. The plate 28 carries a hub 29 and blades 30. The hub 29 extends along the Z1 rotation axis and may be rotatably mounted in the bottom of the bore forming the microturbine chamber 17, optionally introducing a slide ring 24 to form a bearing. The rotor 21 of the generator itself may include a pin 29a rotatably mounted in the bottom of the aforementioned housing 9, optionally introducing a sliding ring 24a to form a bearing.

The blades 30 are arranged around the Z1 rotation axis in a radial median plane, each blade being substantially perpendicular to said median radial plane. The microturbine 18 advantageously has an annular clearance 27 radially located between the hub 29 and the blades 30.

This annular clearance 27 may have a radial thickness such that R−R1 is between 0.7×2 (R−R0)/3 and 1.3×2 (R−R0)/3 (i.e. about 0.47 (R−R0) and 0.87 (R−R0)), with R−R1 advantageously between 0.9×2(R−R0)/3 and 1.1×2 (R−R0)/3 in the order of 2(R−R0)/3, for example, where:

2×R is the outer diameter of the blades 30, i.e. substantially the inner diameter of the microturbine chamber 17 (this diameter may for example be in the order of 1 to 3 cm), 2×R1 is the inner diameter of the blades 30, and 2×R0 is the outer diameter of the hub 29 at the centre of the clearance 27. Said diameter is generally small and may possibly even be reduced to 0 by adopting a microturbine structure having no hub 29 at the centre of the clearance 27 (e.g. the microturbine 18 may comprise two plates 28 axially framing the blades 30, the "upper" plate 28 then being rotatably mounted in the bottom of the bore forming the microturbine chamber 17.

The aforementioned geometry of the microturbine 18 creates a vortex at the centre of the microturbine. The above dimensional ratios in particular enable said vortex to drive a volume of fluid close to that exiting the turbine, which facilitates changes in fluid flow paths in the turbine.

As shown in greater detail in FIG. 4, in addition to the microturbine chamber 17, the throttle passage C may comprise first and second sections C1, C2, respectively linking said microturbine chamber 17 to the working chamber A through the opening 13, and to the compensation chamber B through the opening 12.

Said sections C1, C2 may be respectively delimited by first and second grooves 31a, 31b carved into the first fixed wall 7 and opening downwards, said first and second grooves being closed towards the compensation chamber B by the second fixed wall 8.

In the example, sections C1, C2 each include the portion of an arc centred on the Z0 axis, respectively 32a, 32b. Said portions of an arc 32a, 32b respectively connect the openings 13, 12 to first and second nozzles, 33a, 33b respectively, and opening substantially tangentially into the microturbine chamber 17 (see FIG. 5). Each nozzle 33a, 33b is advantageously ended towards the microturbine chamber 17 by a convergent, 34a, 34b respectively. The first and second nozzles 33a, 33b may open into the microturbine chamber 17 in substantially diametrically opposite positions relative to the Z1 rotation axis The microturbine is advantageously shaped to always be driven in the same rotational direction W by the fluid of the hydraulic circuit when said fluid reciprocates along the first and second opposing paths F1, F2 within the throttle passage C (wherein the F1 path represents a displacement of fluid from the working chamber A to the compensation chamber B, and the F2 path from the compensation chamber to the working chamber A). To this end, the first and second nozzles 33a, 33b open into the microturbine chamber 17 substantially tangentially with respect to the Z1 rotation axis, in the paths F1, F2 respectively, according to the first and second injection paths, wherein both correspond to said rotational direction W. This one-way rotation of the microturbine 18 allows for optimal use of the limited hydraulic power available. The sustained rotation of the microturbine 18 is further facilitated by the aforementioned clearance 27, which allows for the creation of a fluid vortex flow in the rotational direction W.

The blades 30 of the microturbine 18 are preferably curved in the radial plane, with a convex upper surface 30a facing in the rotational direction W and a concave lower surface 30b facing away from the rotational direction W. Advantageously, the lower surface 30b of each blade 30 has a radially inner portion 30c arranged in a substantially radial direction Y and a radially outer portion 30d substantially arranged along the X1, X2 injection path when said blade 30 is respectively positioned in line with any one of the first or second nozzles 33a, 33b.

As shown in FIG. 1, the antivibration mount 1 further comprises an electric actuator 37, similar for example to that described in document EP 1614931, which is adapted to selectively lock or free the movable wall 14 according to the commands of the aforementioned electronic circuit. This actuator 37 may for example comprise an electrically controlled valve which may either uncover or isolate the air chamber delimited by the bowl 10 and the movable wall 14. The actuator 37 comprises in parallel with the aforementioned valve, an air outlet valve which, when the valve is closed, allows only for the outlet of air from the pneumatic chamber, so that a vacuum is gradually created in the pneumatic chamber from the movement of the movable wall 14 due to the vibratory movements of the engine, so that the movable wall is pressed against the bottom of the bowl 10 when a vacuum arises in the pneumatic chamber, thereby blocking said movable wall.

As shown in FIG. 7, the electronic circuit 39 (CIRC.) may for example comprise:

A converter 40 (RECT.) connected to the coils 26 of the generator 20 (GEN.) to generate a direct current from the alternating current produced by said coils 26, A device for storing electric power 41 (ACC.), for example a capacitor, fed by the converter 40, A controller 41a(CONTR.), including for example a microcontroller, powered by the storage device 41 and controlling the actuator 37 (ACT.), A sensor 42 (SENS.) connected to the control device 41a, for example a vibration sensor such as an accelerometer or the like.

This entire electronic circuit 39 may be housed in the interior space 3c of the casing 3b, not requiring information exchange with the outside or external electric power supply. Optionally, the sensor 42 or an additional sensor may be arranged elsewhere than in the casing 3b, depending on the application and mounting of the antivibration mount 1.

The antivibration mount 1 just described operates as follows.

When the vehicle on which the antivibration mount is installed is in operation, engine vibration movements produce fluid movements in the throttle. passage C between the hydraulic chambers A and B, alternately along paths F1 and F2. These fluid movements activate the rotation the microturbine 18 and therefore the rotor 21 in the rotational direction W, so that the coils 26 of the generator produce an electric current subsequently rectified by the converter 40 and stored in the storage device 41.

When the engine is idling without the vehicle running, the relative movements between the first and second frames 2, 3 generally have a frequency of between 10 and 40 Hz, depending on the type of engine and low amplitude (below 0.2 mm). Under these conditions, the electric power produced by the generator 20 is relatively low, in the order of a few dozen hundredths of milliwatts, for example. In such circumstances, detected by using the sensor 42. the control device 41 controls the actuator 37 to free the movable wall 14, which then has a decoupling effect, so as to avoid transmitting engine vibrations to the vehicle body, When the vehicle is running, said relative movements known as jolts between the first and second frames 2, 3 are of relatively low frequency (generally between 10 and 15 Hz depending on engine type) and high amplitude (greater than 0,3 mm), Under these conditions, the electric power produced by generator 20 may he greater, for example a few watts (in the order of 2 W, for example). In such circumstances, detected by using the sensor 42, the control device 41 controls the actuator 37 to lock the movable wall 14 as explained above, so that the throttle passage C then plays its usual antivibration role. The sizing of fluid passage sections in the throttle passage C and in the microturbine does not substantially affect the hydraulic behaviour of the engine mount, and thus the stiffness and phase angle response depending on the excitation frequency of the system, when compared to an antivibration mount lacking a microturbine.

Note that the actuator 37 and the movable wall 14 may be replaced by any other control system or any other active system producing counter-vibrations (the electric actuator supplied by the generator 20 may then control all vibrating control devices, such as the piston, vibrating mass or otherwise).

Note also that the toroidal shape of the stator 22 facilitates start-up of the microturbine under very low stress (under 0.1 mm at the Z0 axis), since there is no magnetic balance hard point between the rotor magnet and the stator: The magnetic forces are on the axis of the magnet and do not interfere with the starting torque.

The invention claimed is:

1. A hydraulic antivibration mount comprising:
a first frame and a second frame,
an elastomer body connecting the first frame and the second frame and at least partially bounding a first hydraulic chamber,
a deformable second hydraulic chamber which connects to the first hydraulic chamber via a throttle passage, the first hydraulic chamber, the second hydraulic chamber and the throttle passage forming a hydraulic circuit filled with fluid, and the antivibration mount being shaped so that said fluid reciprocates along a first path and an opposing second path within said throttle passage when the first frame and second frame are subject to relative vibration movements, and
an electric current-generating device comprising, firstly, a microturbine rotatably mounted about a rotation axis in the throttle passage and secondly, a generator coupled to the microturbine to produce electric current as the microturbine rotates,
wherein the microturbine is configured to be always driven in the same rotational direction by the fluid when said fluid reciprocates along the first and second paths within the throttle passage,
wherein the throttle passage includes a microturbine chamber wherein the inicroturbine is rotatably mounted, and said microturbine chamber is comprised in a partition separating the first and second hydraulic chambers,
wherein the microturbine comprises a plurality of blades arranged around the rotation axis in a median radial plane, each blade being substantially perpendicular to said median radial plane, and said microturbine having a clearance surrounded b said plurality of blades,
wherein the microturbine further comprises at least one hub extending along the rotation axis and at least one radial plate connecting said hub to the blades,
wherein the microturbine chamber is a bore in a first fixed wall, said bore being delimited axially by a bottom and radially by a cylindrical surface into which the first nozzle and second nozzle open, said bore being closed by the radial plate opposite to the bottom of the bore, said hub being rotatably mounted in the bottom of the bore,
wherein the generator comprises a stator and a rotor secured to the microturbine, said rotor including a pin which extends along the rotation axis opposite to said hub, said pin being rotatably mounted in the bottom of a housing containing the generator, and
wherein the throttle passage comprises a first section and a second sections which open into the microturbine chamber respectively through said first nozzle and said second nozzles, said first section and second sections and said first nozzle and second nozzles being delimited respectively by a first groove and a second grooves carved into the first fixed wall and opening axially towards the second hydraulic chamber, said first and second grooves being axially closed by a second fixed wall secured to the first fixed wall and comprising said housing, the first and second fixed walls together forming said partition.

2. A hydraulic antivibration vehicle engine mount, comprising:

first and second frames, an elastomer body connecting the first and second frames and at least partially bound to a first hydraulic chamber, a deformable second hydraulic chamber which connects to the first hydraulic chamber via a throttle passage, the first and second hydraulic chambers and the throttle passage forming a hydraulic circuit filled with fluid, and the antivibration mount being shaped so that said fluid reciprocates along an opposing first and second paths within said throttle passage when the first and second frames are subject to relative vibration movements, an electric current-generating device comprising, firstly, a microturbine rotatably mounted about a rotation axis in the throttle passage and secondly, a generator coupled to the microturbine to produce electric current as the microturbine rotates, wherein the microturbine is configured to be always driven in the same rotational direction by the fluid when said fluid reciprocates along the first and second paths within the throttle passage, an electronic circuit comprising at least:

a converter adapted to convert into direct current an electric current produced by the generator, a device for storing electric power, fed by the converter, and a control device connected to a sensor and adapted to control an actuator based on information received from the sensor, said actuator being adapted to act on a portion of the antivibration mount.

3. The antivibration mount according to claim 2, wherein the throttle passage includes a first nozzle and a second nozzles which open into said microturbine chamber from the first hydraulic chamber and the second hydraulic chamber respectively at a substantial tangent relative to the rotation axis, said first nozzle and second nozzle opening respectively into the microturbine chamber along a first injection path and a second injection paths, both corresponding to said rotational direction.

4. The antivibration mount according to claim 3, wherein the first and second nozzles open into the microturbine chamber at substantially diametrically opposite positions relative to the rotation axis.

5. The antivibration mount according to claim 3, wherein the microturbine has a plurality of curved blades arranged around the rotation axis in a median radial plane, each blade being substantially perpendicular to said median radial plane and including a substantially radial inner portion and an outer portion which is substantially arranged along the first and second injection paths when said blade is respectively aligned with the first and second nozzles.

6. The antivibration mount according to claim 2, wherein the microturbine comprises a plurality of blades arranged around the rotation axis in a median radial plane, each blade being substantially perpendicular to said median radial plane, and said microturbine having a clearance surrounded by said plurality of blades.

7. The antivibration mount according to claim 6, wherein the blades occupy a first radial thickness and said clearance occupies a second radial thickness, said first radial thickness being between 0.47 and 0.87 times the sum of the first and second radial thicknesses.

8. The antivibration mount according to claim 6, wherein the microturbine further comprises at least one hub extending along the rotation axis and at least one radial plate connecting said hub to the blades.

9. The antivibration mount according to claim 8, wherein the microturbine chamber is a bore in a first fixed wall, said bore being delimited axially by a bottom and radially by a cylindrical surface into which the first nozzle and second nozzles open, said bore being closed by the radial plate opposite to the bottom of the bore, said hub being rotatably mounted in the bottom of the bore.

10. The antivibration mount according to claim 9, wherein the generator comprises a stator and a rotor secured to the microturbine, said rotor including a pin which extends along the rotation axis opposite to said hub, said pin being rotatably mounted in the bottom of a housing containing the generator.

11. The antivibration mount according to claim 2, wherein said sensor is a vibration sensor secured to the second frame.

12. The antivibration mount according to claim 2, wherein said actuator is adapted to selectively lock or free a movable wall which partially delimits the first hydraulic chamber.

* * * * *